No. 877,718. PATENTED JAN. 28, 1908.
C. E. KELLY.
TWINE TAKE-UP MOTION.
APPLICATION FILED NOV. 18, 1907.

WITNESSES:
Ada E. Fagerly
Chas. H. Luther

INVENTOR:
Charles E. Kelly
by Joseph A. Miller
ATTORNEY

UNITED STATES PATENT OFFICE.

CHARLES E. KELLY, OF PROVIDENCE, RHODE ISLAND.

TWINE-TAKE-UP MOTION.

No. 877,718.  Specification of Letters Patent.  Patented Jan. 28, 1908.

Application filed November 18, 1907. Serial No. 402,584.

*To all whom it may concern:*

Be it known that I, CHARLES E. KELLY, a citizen of the United States, residing at Providence, in the county of Providence and State of Rhode Island, have invented a new and useful Improvement in Twine-Take-Up Motions, of which the following is a specification.

This invention has reference to an improvement in take-up motions and more particularly to an improvement in automatic twine take-up motions.

In the use of twine for tying up bundles or similar articles, the twine holder is usually suspended from the ceiling over the counter. The twine is pulled downward from the holder when in use and after the required amount of twine is used there is necessarily left hanging from the holder a long end of the twine which lies on the counter, is in the way of or is annoying to the user, and is liable to be broken off (either by accident or design) and thrown away or wasted.

The object of my invention is to improve the construction of a twine take-up motion, whereby after the required length of twine has been used, the left over portion or the long end of the twine is automatically removed from the counter or out of the way of the user, leaving a short end of twine above in a convenient position for the user.

A further object of my invention is to provide an automatic twine take-up motion which may be located adjacent the twine holder or in any convenient position and prevents unnecessary waste of the twine when in use.

My invention consists in the peculiar and novel construction of a twine take-up motion adapted to automatically take up the long end or excess of the twine left hanging after use and having details of construction, as will be more fully set forth hereinafter and claimed.

Figure 1:
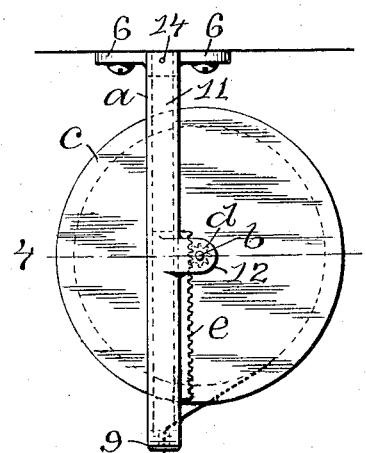
Figure 2:
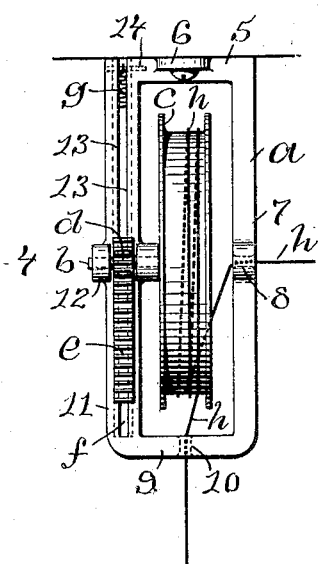
Figure 3:
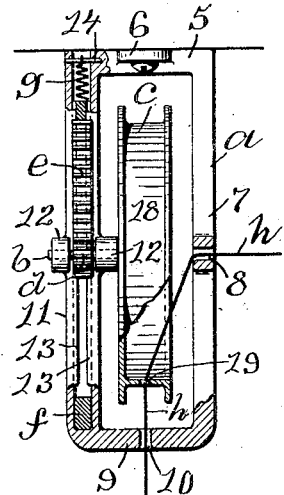

Figure 1 is a side view of my improved automatic twine take-up motion, showing the same in its normal position. Fig. 2 is a front view, showing the excess of twine wound on the drum of the take-up motion. Fig. 3 is a front view similar to Fig. 2, partly in section, and showing the excess of twine unwound from the drum and the twine in a position to be pulled from the twine holder (not shown) directly through the take-up motion, and Fig. 4 is an enlarged transverse sectional view taken on line 4 4 of Fig. 1 through the take-up motion to show the construction of the same.

In the drawings, $a$ indicates the frame, $b$ the shaft, $c$ the take-up drum, $d$ the pinion, $e$ the weight rack, $f$ the lower rubber buffer, $g$ the upper spring buffer and $h$ a piece of twine shown to illustrate the operation of my improved automatic twine take-up motion.

Figure 4:
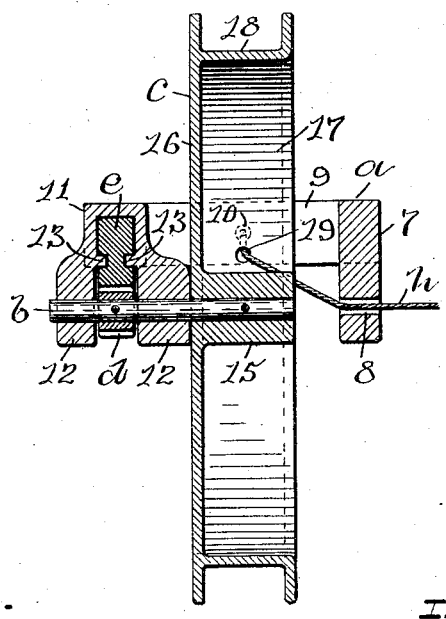

The frame $a$ is of a hollow rectangular form having a top 5 on which are the outwardly-extending ears 6 6 for securing the frame to the ceiling or other convenient place, a vertical side 7 in which is a guide eye 8 for the twine $h$ on a line with the center of the take-up drum $c$, a bottom 9 in which is a guide eye 10 for the twine $h$, and a hollow vertical side 11 having the bearings 12 12 for the shaft $b$ and the undercut guide ways 13 13 for the weight rack $e$, as shown in Fig. 4. The rubber buffer $f$ is held in the bottom of the hollow side 11 and the spring buffer $g$ is held in the top of the hollow side 11 by a pin 14, as shown in Fig. 3.

The take-up drum $c$ is in the form of a pulley having the central hub 15 secured to the inner end of the shaft $b$ by a pin or other means, a closed end 16, an open end 17, and a grooved face 18 in which is a guide eye 19 for the twine $h$, as shown in Fig. 4.

The pinion $d$ is secured to the shaft $b$ intermediate the bearings 12 12 by a pin or other means in a position to mesh with the teeth on the weight rack $e$ which has a sliding fit in the hollow side 11 and is held in the side by the ways 13 13, as shown in Fig. 4.

In the operation of my improved automatic twine take-up motion, the take-up drum $c$ is revolved to raise the weight rack $e$ and bring the guide eye 19 in the face of the drum over the guide eye 10 in the bottom 9 of the frame $a$, as shown in Fig. 3. The twine $h$ is now carried from the twine holder (not shown) or any source of twine supply and the end of the twine passed through the guide eye 8 in the side 7 of the frame, the open end 17 of the drum, the guide eye 19 in the face of the drum and down through the guide eye 10 in the bottom 9 of the frame, from which it is pulled for a predetermined length. The take-up drum $c$ is now released and the weight of the rack $e$ in its downward movement, through the teeth on the rack meshing with the pinion $d$, revolves the take-up drum $c$ in the opposite direction and winds the twine, previously drawn through, onto the grooved face 18 of the drum, leaving a short end of the twine in a convenient position for the user, as shown in Fig. 2.

In the use of the twine take-up motion the user pulls the end of the twine down, thus unwinding the twine from the take-up drum c, revolving the drum and raising the weight rack e, as shown in Fig. 3. The twine is now pulled through the guide eyes 8, 19 and 10 until the required amount is used and broken off. The end of the twine is now released and the excess of twine drawn up and wound automatically on the take-up drum c by the down movement of the weight rack e, as shown in Fig. 2, thus taking up the excess of twine out of the way and preventing loss or waste of the twine.

It is evident that my improved automatic twine take-up motion may be attached to or form an integral part of any of the usual forms of twine holders, without materially affecting the spirit of my invention.

Having thus described my invention, I claim as new and desire to secure by Letters Patent:—

1. In a twine take-up motion, a frame, a shaft rotatably supported in bearings on the frame, a drum having an open end and a grooved face secured to the shaft, a weight rack reciprocally supported in the frame, a pinion on the shaft meshing with the teeth on the rack, and means for threading twine through the frame and the drum, whereby an excess of twine is automatically wound on the drum by a downward movement of the weight rack.

2. In an automatic twine take-up motion, the combination of the following instrumentalities; a frame a, a shaft b rotatably supported in bearings in the frame a, a drum c secured to the inner end of the shaft b, a pinion d secured to the shaft b, a weight rack e reciprocally supported in the frame a and meshing with the pinion d, a buffer f in the frame a under the lower end of the rack e, a buffer g in the frame a over the upper end of the rack e, and means for threading twine through the side of the frame a, the face of the drum c and the bottom of the frame a, as described.

In testimony whereof I have signed my name to this specification in the presence of two subscribing witnesses.

CHARLES E. KELLY.

Witnesses:
ADA E. HAGERTY,
J. A. MILLER.